United States Patent
Laaksonen et al.

(10) Patent No.: US 10,607,410 B2
(45) Date of Patent: Mar. 31, 2020

(54) DISPLAYING VISUAL INFORMATION OF VIEWS CAPTURED AT GEOGRAPHIC LOCATIONS

(71) Applicant: Nokia Technologies Oy, Espoo (FI)

(72) Inventors: Lasse Laaksonen, Tampere (FI); Arto Lehtiniemi, Lemäälä (FI); Mikko Tammi, Tampere (FI); Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/070,572

(22) PCT Filed: Jan. 17, 2017

(86) PCT No.: PCT/FI2017/050019
§ 371 (c)(1),
(2) Date: Jul. 17, 2018

(87) PCT Pub. No.: WO2017/125643
PCT Pub. Date: Jul. 27, 2017

(65) Prior Publication Data
US 2019/0026944 A1 Jan. 24, 2019

(30) Foreign Application Priority Data

Jan. 22, 2016 (EP) .................................... 16152488

(51) Int. Cl.
*G06T 15/20* (2011.01)
*G06T 17/05* (2011.01)
(Continued)

(52) U.S. Cl.
CPC ............ *G06T 19/003* (2013.01); *G06T 15/20* (2013.01); *G06T 17/005* (2013.01); *G06T 17/05* (2013.01); *G06T 17/10* (2013.01)

(58) Field of Classification Search
CPC ....... G06T 15/20; G06T 17/005; G06T 17/05; G06T 17/10; G06T 19/003
See application file for complete search history.

(56) References Cited

U.S. PATENT DOCUMENTS

2013/0342525 A1* 12/2013 Benko ..................... G06F 3/013
345/419

FOREIGN PATENT DOCUMENTS

WO 2017/001729 A1 1/2017

OTHER PUBLICATIONS

Extended European Search Report received for corresponding European Patent Application No. 16152488.9, dated Jun. 30, 2016, 11 pages.

(Continued)

*Primary Examiner* — Sing-Wai Wu
(74) *Attorney, Agent, or Firm* — Harrington & Smith (57) ABSTRACT

A method, apparatus and computer program for displaying at least a part (101a) of first visual information (101) that is a view (102a'), from a first geographical location (103); generating a visualisation (400) configured to visually link the display of at least a part (101a) of the first visual information (101) with a display of at least a part (201a) of second visual information (201) that is a view (202a') from a second geographical location (203), wherein generating the visualisation comprises: determining a direction (112) of the second geographical location (203) with respect to the first geographical location (103); defining a virtual object (401) having: a virtual primary axis (402) aligned with the direction (112), a virtual distal end surface (403), at least a part of which defines a first virtual display surface (403a), and at least one virtual inner surface (404), at least a part of which defines at least a second virtual display surface (404a); displaying on the first virtual display surface (403a) at least a part (201a) of the second visual information (201); and displaying on the at least second virtual display surface (404a), at least a part (301a) of third visual information (301).

20 Claims, 5 Drawing Sheets

(51) Int. Cl.
*G06T 17/10* (2006.01)
*G06T 19/00* (2011.01)
*G06T 17/00* (2006.01)

(56) References Cited

OTHER PUBLICATIONS

"How PhotoSynth Can Connect the World's Images", TED Ideas Worth Spreading, Retrieved on Jun. 29, 2018, Webpage available at : https://www.ted.com/talks/blaise_aguera_y_arcas_demos_photosynth.

Kushal et al., "Photo Tours", Second International Conference on 3D Imaging, Modeling, Processing, Visualization & Transmission, 2012, pp. 57-64.

Liu et al., "Finding Perfect Rendezvous on the go: Accurate Mobile Visual Localization and its Applications to Routing" Proceedings of the 20th ACM international conference on Multimedia, Oct. 29-Nov. 2, 2012, 10 pages.

Uricchio, "The Algorithmic Turn: Photosynth, Augmented Reality and the Changing Implications of the Image", JournalVisual Studies, vol. 26, No. 1, 2011, pp. 25-35.

International Search Report and Written Opinion received for corresponding Patent Cooperation Treaty Application No. PCT/FI2017/050019, dated Feb. 22, 2017, 17 pages.

\* cited by examiner

FIG. 10

DISPLAYING VISUAL INFORMATION OF VIEWS CAPTURED AT GEOGRAPHIC LOCATIONS

RELATED APPLICATION

This application was originally filed as Patent Cooperation Treaty Application No. PCT/FI2017/050019 filed Jan. 17, 2017 which claims priority benefit to EP Patent Application No. 16152488.9, filed Jan. 22, 2016.

TECHNOLOGICAL FIELD

Examples of the present disclosure relate to displaying visual information of views captured at geographic locations. Some examples, though without prejudice to the foregoing, relate to a method, apparatus and computer program for rendering first and second visual information of first and second views captured at first and second geographical locations. Certain examples relate to rendering first and second presence capture information of first and second scenes captured at first and second presence capture locations.

BACKGROUND

In 'presence capture' systems, visual information representative of one or more views/scenes in one or more directions may be captured by one or more image capture devices located at a particular single geographic real-world location. For example, a panoramic or a 360° (2π radians) view of a location may be captured, or even a 720° (4π steradians) view, i.e. 360° view about each of a vertical and horizontal axis. The captured visual information may be displayed on a display device to enable a viewer to look around/pan around the visual information to perceive varying directions of views of the visual information captured at the geographic location. In such a manner the viewer may experience being virtually 'present' at the geographical location. Such captured spatial visual information, e.g. images/videos of views/scenes/a visual environment captured at a particular geographical location in various directions, may be referred to as 'presence capture information'.

Conventional systems for displaying presence capture information are not always optimal. Such systems may not effectively be able to simultaneously display first presence capture information (of a first presence capture location) and second presence capture information (of a second presence capture location) in an intuitive manner that is minimally disorientating or distracting to the viewer who may be deeply immersed in viewing the presence capture information. This can cause a reduction in the viewer's level of immersion and/or adversely impact the viewer's user experience of consuming presence capture content.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

According to various but not necessarily all examples of the disclosure there is provided a method comprising:

displaying at least a part of first visual information that is a first view, from a first geographical location;

generating a visualisation configured to visually link the display of the at least a part of the first visual information with a display of at least a part of second visual information that is a second view from a second geographical location, wherein generating the visualisation comprises:

determining a direction of the second geographical location with respect to the first geographical location;

defining a virtual object having:

a virtual primary axis aligned in dependence on the direction, a virtual distal end surface, at least a part of which defines a first virtual display surface, and at least one virtual inner surface, at least a part of which defines at least a second virtual display surface;

displaying on the first virtual display surface at least a part of the second visual information; and displaying on the at least second virtual display surface, at least a part of third visual information.

According to various but not necessarily all examples of the disclosure there is provided an apparatus comprising:

means configured to display at least a part of first visual information that is a first view, from a first geographical location;

means configured to generate a visualisation configured to visually link the display of the at least a part of the first visual information with a display of at least a part of second visual information that is a second view from a second geographical location, wherein the means configured to generate the visualisation comprises:

means configured to determine a direction of the second geographical location with respect to the first geographical location;

means configured to define a virtual object having:

a virtual primary axis aligned in dependence on the direction, a virtual distal end surface, at least a part of which defines a first virtual display surface, and at least one virtual inner surface, at least a part of which defines at least a second virtual display surface;

means configured to display on the first virtual display surface at least a part of the second visual information; and means configured to display on the at least second virtual display surface, at least a part of third visual information.

According to various but not necessarily all examples of the disclosure there is provided an apparatus comprising at least one processor; and at least one memory including computer program code;

the at least one memory and the computer program code configured to, with the at least one processor, cause the apparatus at least to perform:

displaying at least a part of first visual information that is a first view, from a first geographical location;

generating a visualisation configured to visually link the display of the at least a part of the first visual information with a display of at least a part of second visual information that is a second view from a second geographical location, wherein generating the visualisation comprises:

determining a direction of the second geographical location with respect to the first geographical location;

defining a virtual object having:
  a virtual primary axis aligned in dependence on the direction,
  a virtual distal end surface, at least a part of which defines a first virtual display surface, and
  at least one virtual inner surface, at least a part of which defines at least a second virtual display surface;
displaying on the first virtual display surface at least a part of the second visual information; and
displaying on the at least second virtual display surface, at least a part of third visual information.

According to various but not necessarily all examples of the disclosure there is provided a computer program that, when performed by at least one processor, causes the following to be performed:
displaying at least a part of first visual information that is a first view, from a first geographical location;
generating a visualisation configured to visually link the display of the at least a part of the first visual information with a display of at least a part of second visual information that is a second view from a second geographical location, wherein generating the visualisation comprises:
  determining a direction of the second geographical location with respect to the first geographical location;
  defining a virtual object having:
    a virtual primary axis aligned in dependence on the direction,
    a virtual distal end surface, at least a part of which defines a first virtual display surface, and
    at least one virtual inner surface, at least a part of which defines
    at least a second virtual display surface;
  displaying on the first virtual display surface at least a part of the second visual information; and
  displaying on the at least second virtual display surface, at least a part of third visual information.

According to various but not necessarily all examples of the disclosure there is provided a non-transitory computer readable medium encoded with instructions that, when performed by at least one processor, causes at least the following to be performed:
displaying at least a part of first visual information that is a first view, from a first geographical location;
generating a visualisation configured to visually link the display of the at least a part of the first visual information with a display of at least a part of second visual information that is a second view from a second geographical location, wherein generating the visualisation comprises:
  determining a direction of the second geographical location with respect to the first geographical location;
  defining a virtual object having:
    a virtual primary axis aligned in dependence on the direction,
    a virtual distal end surface, at least a part of which defines a first virtual display surface, and
    at least one virtual inner surface, at least a part of which defines at least a second virtual display surface;
  displaying on the first virtual display surface at least a part of the second visual information; and
  displaying on the at least second virtual display surface, at least a part of third visual information.

According to various but not necessarily all examples of the disclosure there is provided a chipset comprising processing circuitry or a module configured to:
display at least a part of first visual information that is a first view, from a first geographical location;
generate a visualisation configured to visually link the display of the at least a part of the first visual information with a display of at least a part of second visual information that is a second view from a second geographical location, wherein generating the visualisation comprises:
  determining a direction of the second geographical location with respect to the first geographical location;
  defining a virtual object having:
    a virtual primary axis aligned in dependence on the direction,
    a virtual distal end surface, at least a part of which defines a first virtual display surface, and
    at least one virtual inner surface, at least a part of which defines
    at least a second virtual display surface;
  displaying on the first virtual display surface at least a part of the second visual information; and
  displaying on the at least second virtual display surface, at least a part of third visual information.

According to various, but not necessarily all, embodiments of the invention there is provided examples as claimed in the appended claims.

BRIEF DESCRIPTION OF THE DRAWINGS

For a better understanding of various examples of the present disclosure that are useful for understanding the detailed description and certain embodiments of the invention, reference will now be made by way of example only to the accompanying drawings in which.

DETAILED DESCRIPTION

Examples of a method, apparatus and computer program according to the present disclosure will now be described with reference to the Figures.

The Figures are not necessarily to scale. Certain features and views of the Figures may be shown schematically or exaggerated in scale in the interest of clarity and conciseness. For example, the dimensions of some elements in the Figures may be exaggerated relative to other elements to aid explication.

Similar reference numerals are used in the Figures to designate similar features. For clarity, all reference numerals are not necessarily displayed in all Figures.

Figure 8:
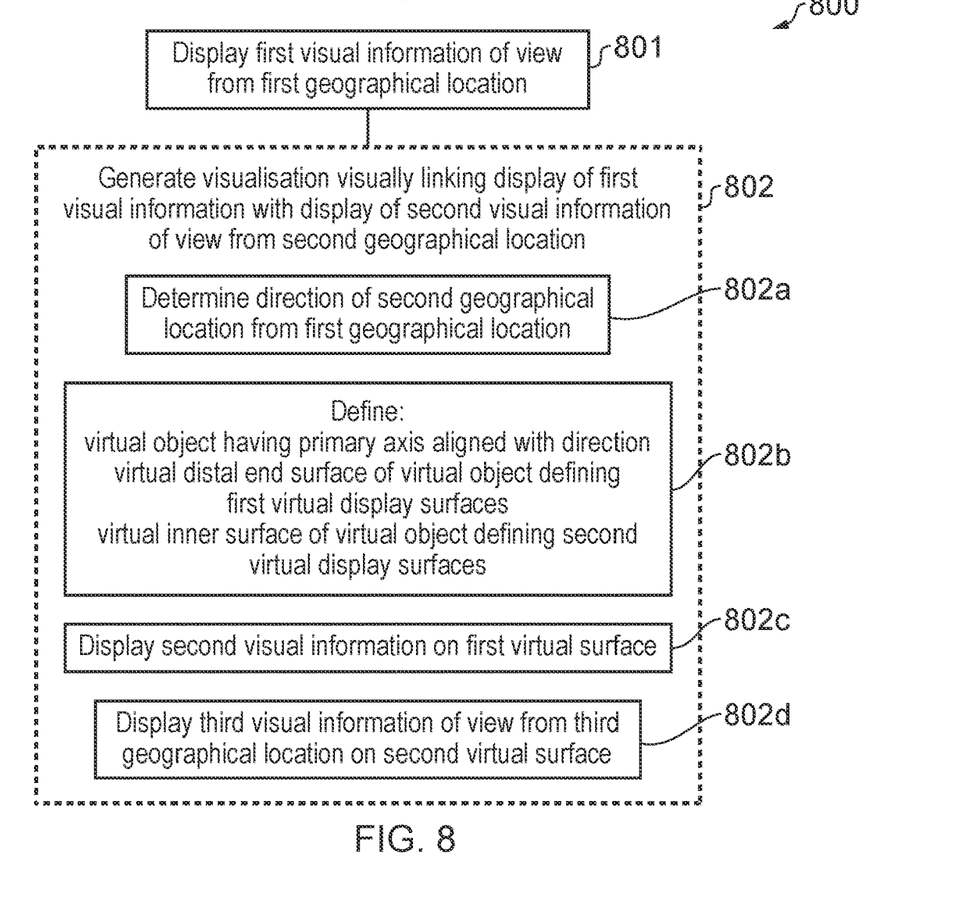
FIG. 8 schematically illustrates a method.

The Figures schematically illustrate a method 800 comprising causing/enabling/facilitating:

displaying 801 at least a part 101a of first visual information 101 that is a view 102a', from a first geographical location "A" 103;

generating 802 a visualisation 400 configured to visually link the display of the at least a part 101a of the first visual information 101 with a display of at least a part 201a of second visual information 201 that is a view 202a' from a second geographical location "B" 203, wherein the generating of the visualisation 400 comprises:

determining 802a (e.g. calculating or receiving) a direction 112 of the second geographical location 203 with respect to the first geographical location 103 (such a direction may correspond to a virtual line of sight of B from A);

defining 802b a virtual object 401 having:
a virtual primary axis 402 aligned in dependence on the direction 112,
a virtual distal end surface 403, at least a part of which defines a first virtual display surface 403a, and
at least one virtual inner surface 404, at least a part of which defines at least a second virtual display surface 404a;

displaying 802c (e.g. simultaneously with and/or overlaying the display of the first visual information 101) on the first virtual display surface 403a at least a part 201a of the second visual information 201; and displaying 802d on the at least second virtual display surface 404a, at least a part 301a of third visual information 301.

Figure 1A:
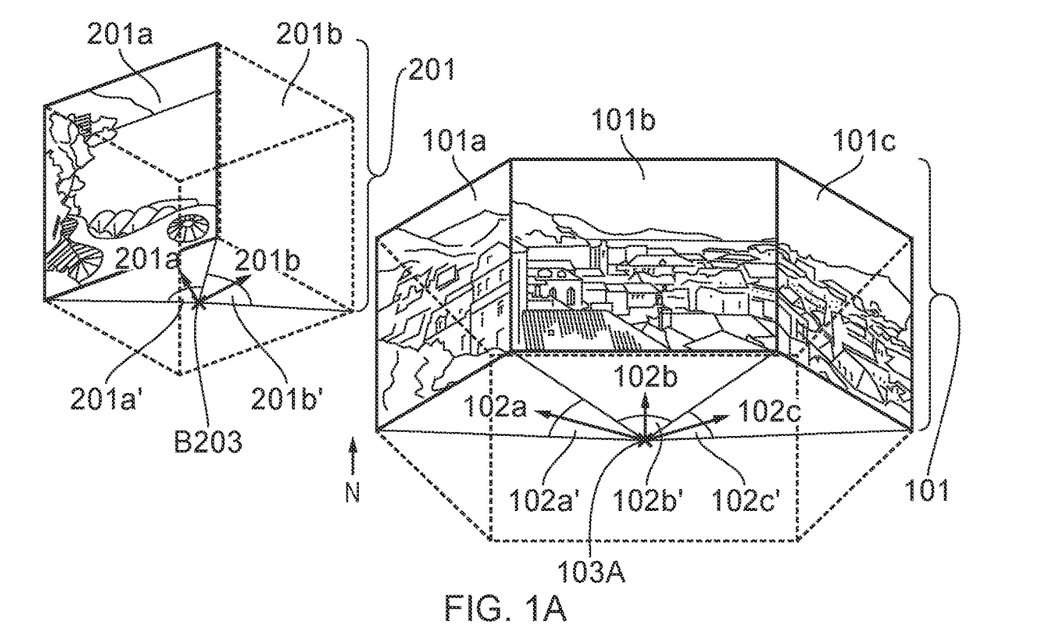
FIG. 1A schematically illustrates first and second presence capture information captured at first and second presence capture locations.

As schematically illustrated in FIG. 1A, the visualisation information 101 may comprise: one or more images (or videos) 101a-101c of one or more viewpoints 102a'-102c' captured by an image capture device from one or more directions 102a-102c at a geographical location 103, such as a physical real-world location A. One or more parts 101a-101c of the visualisation information 101 (such as constituent images/videos captured in particular directions 102a-c from the geographical location 103) may be associated, e.g. not least via metadata, with the geographical location 103 and the direction 102a-c at which they were captured at so as to provide spatial visual information.

In some examples, the visualisation information 101 may comprise a composite mosaic of captured images/videos so as to provide a panoramic view or viewpoint coverage of: 90, 120, 180 or 360 degrees (27 radians) about a vertical axis or complete viewpoint coverage of 720 degrees, namely two 360 degree views about each of a horizontal and vertical axis, i.e. 47 steradians. The visualisation information 101 may be captured by one or more image capture devices located at the particular geographic location 103 capturing images/videos at varying directions 102a-102c from the geographic location 103. For example, the visualisation information 101 may be captured by a stationary image capture device, e.g. with a plurality of camera modules capturing images at differing viewpoints/directions 102a-102c, or an image capture device whose orientation (e.g. pan/tilt) is adjusted to capture images at differing viewpoints/directions 102a-102c.

The visual information 101, may be presence capture information, captured by a presence capture device at a presence capture location. Such presence capture information, in addition to including visual information 101 associated with a location and direction of view (i.e. "spatial" visual information of the visual scene at the location), may also include audio information, i.e. directional spatial audio captured at the particular geographical location 103 at various differing directions/perspectives 102a-c. In such a manner the presence capture information may comprise audio/visual content, such as views and sounds, captured at the presence capture location from various directions/perspectives 102a-c so as to capture a real world visual/aural scene of a real world location so as to enable a recreation of a virtual visual/aural scene representative of the visual and aural environment of the real world location.

The second visualisation information 201 may be similar in nature to the first visualisation information 101, albeit captured from a second geographic location 203. For example, the second visualisation information 201 may correspond to second presence capture information captured by a second presence capture device at a second presence capture location.

The visualisation information may be pre-captured and pre-stored to be accessed for display or it may be captured live and be transmitted for reception and display substantially in real time. The visualisation information may be displayed by a display device, not least for example a virtual reality display system, such as a virtual reality near eye display/headset, that may provide interactive viewing functionality such that the viewer turning his/her head controls the viewpoint direction of the visual information that is displayed so as to enable display of the visual information at different perspectives/viewing at different directions. For example, this may enable a viewer to navigate around/pan around the displayed image/video of the visual information to view the image/video from varying viewpoints/perspectives.

The visual information/presence capture information may be displayed/rendered on a presence capture information rendering device, such as, not least for example a head-mounted display (and binaural headset) utilizing head tracking. The presence capture information rendering system may enable a viewer to perceive the captured visual and aural environment of the presence captured geographic location, such that the viewer feels as though he/she is (virtually) present at the geographic location. The presence capture may be done at a single position, which may then correspond to the position of a viewer when viewing the presence capture information.

The display of at least a part of first visual information 101 may comprise displaying a portion of the visual information 101a which is less than its entirety. The displayed part of the visualisation information 101 may be dimensioned framed, cropped etc., such that only a portion of the visualisation information 101 may be displayed at any one time such that a viewer may pan his/her view within the visual information 101.

The display of at least a part of first visual information 101 may comprise: selecting a particular live/real time presence capture stream (which is associated with a particular viewpoint direction 102a and/or a particular image capture device orientated at the particular viewpoint direction 102a) for receiving and displaying visual information for the particular viewpoint direction. Alternatively, the act of displaying at least a part of first visual information 101 may comprise: selecting a particular pre-captured presence capture file, or portion thereof, (which is associated with a particular viewpoint direction 102a) for accessing and displaying visual information for the particular viewpoint direction 102a. Yet further, the act of displaying at least a part of first visual information may comprise: receiving the first visualisation information, e.g. comprising visual information representative of views from 0-360°, determining a particular viewpoint direction 102a and processing the visualisation information 101 to extract and render a part of the visualisation information 101a so as to display a view corresponding to the determined viewpoint direction 102a. In this regard, the directional viewpoint 102a may relate to a direction of a viewer's real world point of view.

The visualisation information may be received from a memory of a device separate of the display device, such as a repository, a visual information provider, a server or a camera module over a wired or wireless network via one or more intermediate apparatuses and servers. The visual information need not necessarily correspond to a (single) view captured from a certain (single) camera, but it may be a composite or fusion of at least two camera captures.

The display of the first visualisation information 101 may further comprise adjusting and rendering the visual information 101 so as to display a view 102a' from a particular viewpoint direction 102a (e.g. a viewpoint direction 102a that may dependent on a viewer's/user's real world point of view). The same likewise may apply for the display of the second visual information 201.

The display of second visual information 201 may further comprise modifying the second visual information 201 in dependence on a determined real world point of view of a viewer/user, i.e. adjust or adapt the rendering of the visual information (such as skewing or distorting the visual information) so as to correspond to the viewer's perspective of the first virtual display surface. The same may likewise apply for the display of third visual information 301 on the at least one second virtual display surface.

FIG. 1A schematically illustrates first visualisation information 101 which may correspond to first presence capture information captured by a first presence capture device at first presence capture location 103 "A". FIG. 1A also schematically illustrates second visualisation information 201 which may corresponds to second presence capture information captured by a second presence capture device at a second presence capture location 203 "B".

Figures 1B, 2:
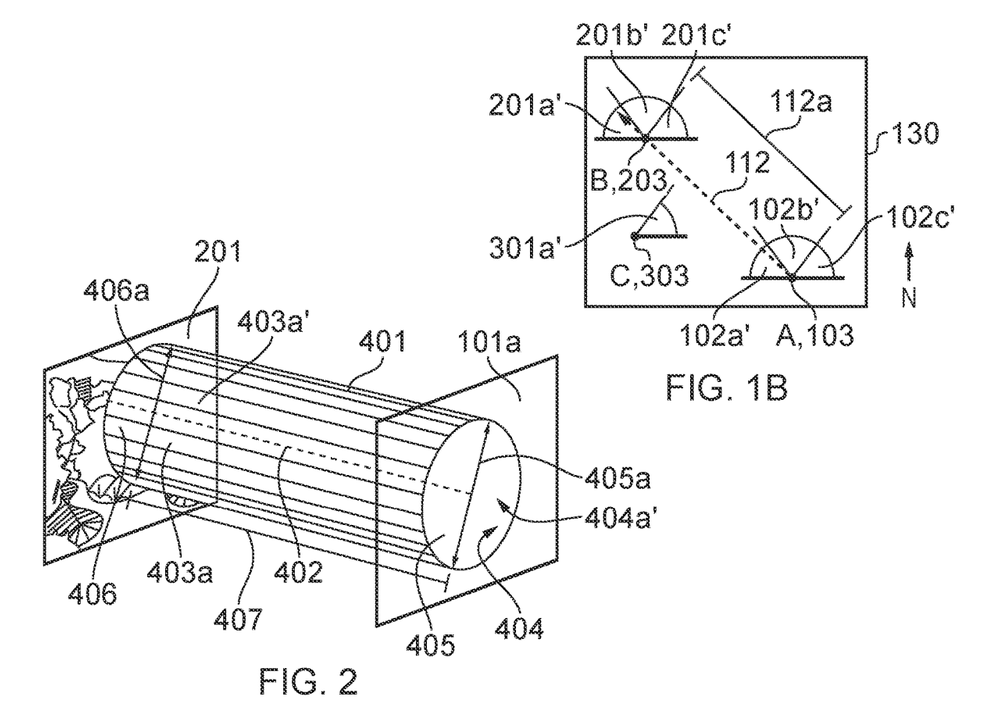
FIG. 1B schematically illustrates a map of first and second presence capture locations.
FIG. 2 schematically illustrates a virtual object.

FIG. 1B shows a plan view of a map illustrating first, second and third geographical locations A 103, B 203 and C 303 respectively. The first and second viewpoint locations may correspond to presence capture locations at which a plurality of viewpoints 102a', 102b' and 102c' have been captured and likewise, at the second geographical location B 203, a plurality of images have been captured at differing viewpoints 201a', 201b' and 201c'. The second geographical location B is located in a direction 112 with respect to the first geographic location 103. Furthermore, the geographic locations B and A are separated by a separation distance 112a. The third visualisation information 301 may correspond to a viewpoint 301a' as perceived from a third geographic location C 303 which represents a view of an area between the first and second geographic locations A 103 and B 203. In some examples, the third visual information may relate to a route or way between the first and the second locations.

The representations of first and second visualisation information 101,201 shown in FIG. 1A are simplified. It is to be appreciated that each visualisation information may offer 360/720 degree views. Each visualisation information 101, 201 may comprise a plurality of differing fields of view 102a'-c', 201a'-'b at a plurality of differing viewing directions 102a-c, 201a-b so as to virtually visually represent the real world visual environment at the locations A and B.

Examples of the disclosure may create a link between two content streams/files of presence capture information that provide the first and second visualisation information for displaying first and second views. Such a link is provided with the creation of a virtual object such as a "virtual tube".

FIG. 2 schematically and conceptually illustrate elements of the visualisation 400, namely a virtual tube leading to/from viewpoints 102a'-102c' of the first and second visualisation information 101, 201. In sense, the virtual tube may be given by a straight line from a first location A to a second location B. The straight line may correspond to a virtual line of sight of location B from location A. The tube/tunnel may have some application specific or user definable diameter or circumference such that the opening at each end covers a given area. The two openings need not be of the same size, nor do they need to be round. In terms of viewing content, the tube/tunnel further has inside walls, an inner surface, the area of which will depend on the length of the tube/tunnel as well as its diameter. The length may correspond to the real world distance between the two locations or at least be dependent upon the real world separation distance. Furthermore, the length of the tube may depend on the amount and relevance of information and visual content available between the two presence capture locations. The scale at which the second visual information of the second location is presented need not be relative to the real world separation distance. Instead, in certain examples, the scale of the presented second visual information may generally correspond a scale the user would perceive if the user were viewing the second visual information at the second location.

In the example of a virtual object 401 shown in FIG. 2, the virtual object takes the form of a virtual tube/tunnel linking the first and second visualisation information 101 and 201. However, the virtual object 401 may be other shapes, not least for example: a cone, a frusto-conical shape, a cylinder, a polyhedron, a hexahedron, a prism, a pyramid, a frustum. In some examples, it may comprise an open ended elongate shape the distal and proximal ends of which need not necessary be of the same size, such as for a frusto-conical shape (apex truncated cone) and a frustum (apex truncated pyramid). The distal (apex) and proximal (base) end surfaces of the virtual object 401 need not be parallel but could, in some examples, be non-parallel. In some examples, the shape may change and adapt, e.g., based on the user's viewing angle.

The proximal end 405, e.g. open ended base of the virtual object 401 may be located on an image plane (which in this case corresponds to the image/display plane of the displayed part 101a of the first visual information). The virtual object 401 may be considered to extend beyond/behind the image plane such that its distal end/apex end 406 may be considered to virtually project inwardly beyond the image plane in a direction away from the viewer, i.e. such that the virtual object has a longitudinal/elongate dimension/virtual depth extent 407.

The virtual display surfaces 403a' and 404a' may define a virtual boundary within which a part of the second and third visualisation information 201, 301 may be rendered/displayed. The virtual display surfaces 403a', 404a' may provide a viewport/window for the parts of the second and third visualisation information 201, 301 to be rendered/displayed on, i.e. they provide a virtual surface onto which the respective visualisation information is mapped/rendered for display.

A size/dimension 406a of the distal end 406 surface/first virtual display surface 403a' may be dependent on a separation distance 112a between the first and second geographical locations 103, 203, e.g. the further away the second location 203 is from the first location 103, the smaller "viewport/window" for displaying a part of the second visualisation 201. Whereas the closer the second location 203 is to the first location 103, the larger the viewing window. Likewise, a size/dimension 405a of the proximal end surface 405/second virtual display surface 404a' may be dependent on the separation distance 112a.

Also a virtual depth 407 (longitudinal/elongate dimension) of the virtual object 401 may be dependent on the separation distance 112a between the first and second geographical locations 103 and 203. For example, the further away the second location 203 is from the first location 103, the longer the virtual object 401 (one might consider this to correspond to a virtual tunnel, on a display end of which is displayed the second visual information 201 and on a part of the inner surface of which is displayed the third visual information 301, that acts to visually link the display of the first and second visual information 101 and 201). Advantageously, this may provide an intuitive indication as to physical distances between presence capture locations.

Figure 3A:
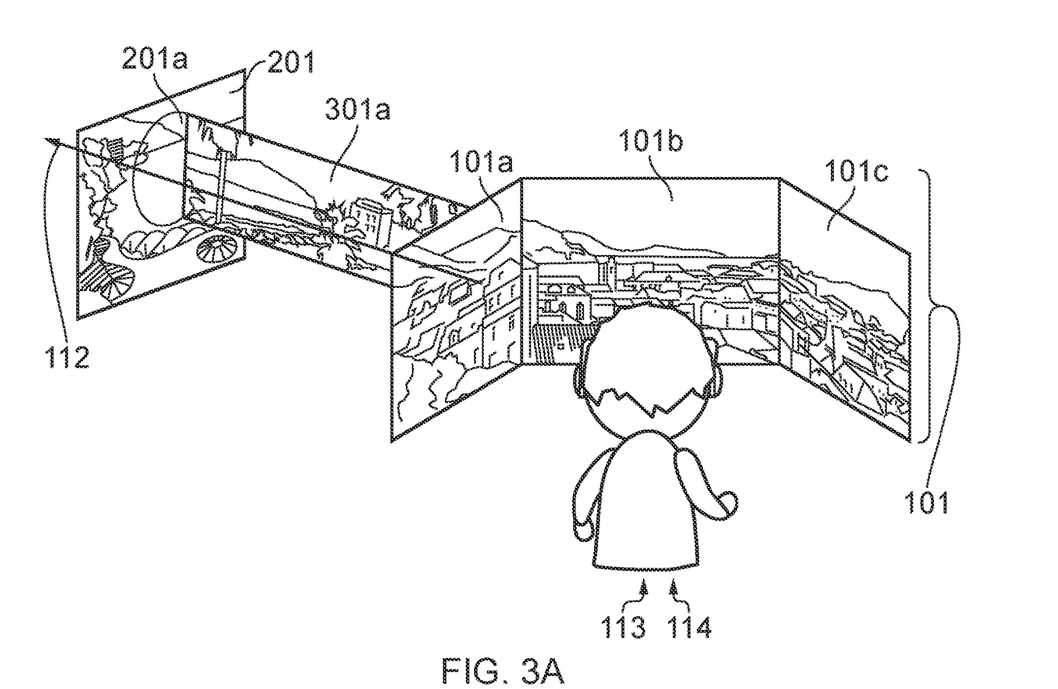
FIGS. 3A and 3B schematically illustrate a visualisation visually linking a display of first and second presence capture information.

FIG. 3A presents a conceptual schematic illustration of a virtual tube that may be established between locations A and B. The tube/tunnel is simplified in this Figure to only show an inner wall visualisation of content that is available for the area located between the two presence capture locations A and B.

Thus, the view in FIG. 3A may be considered as corresponding to a part of the inner wall of the tube visualised in FIG. 2.

Figure 3B:
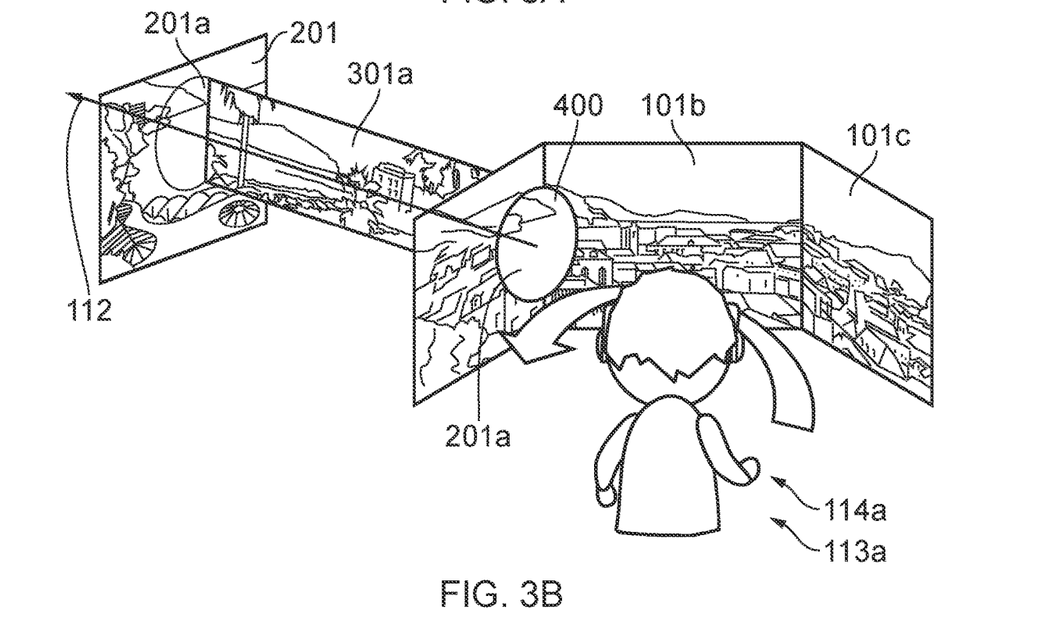

As shown in FIGS. 3A and 3B, the at least part 301a of the third visual information 301 may comprise a view 301a' from a third geographical location 303. In such a manner, the third visual information 301 may comprise a view between the first and second geographic locations 101 and 201. Moreover, the arrangement and configuration of the display of the first, second and third visual information 101, 201, 301 using the virtual object 401 and virtual display surfaces 403a', 404a' thereon may provide a visual link between the displays of the first and second geographic locations 103, 203 which may provide a more intuitive and less intrusive display of the first and second visual information 101, 201 and may thereby provide a more immersive user experience for the viewer. In the visualisation shown in FIG. 3B, a viewer would only see a single "slice" or "direction" of the 360/720 degree view that is available at location B by viewing it, through the visualisation, from location B.

With reference to FIG. 3A, initially, a user/viewer may be currently viewing/perceiving first visual information 101 as if he were located at position A, i.e. a virtual location of the viewer may be considered to be the location 103. The viewer's view/field of view may correspond to some 180 degrees of the overall view in the horizontal direction. For the sake of simplicity, FIG. 3A only shows the 180 degree view, but it is to be appreciated that the full 360 degree view may be able to be presented (e.g. if a user were to turn his/her head around). The view displayed to the viewer corresponds to a view of the visual information 101 in a direction 114 that is dependent on the viewer's real world point of view 113, i.e. the user's real point of view determines the point of view displayed.

FIG. 3B provides a further illustration, where the viewer turns his/her head. The view displayed to the viewer corresponds to a view of the visual information in a direction 114a corresponding to the viewer's real world point of view 113a.

Figure 4A:
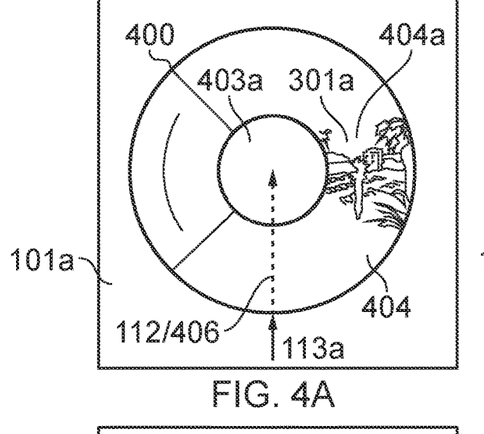
FIGS. 4A and 4B schematically illustrate a visualisation from a viewer's perspective.
Figure 4B:
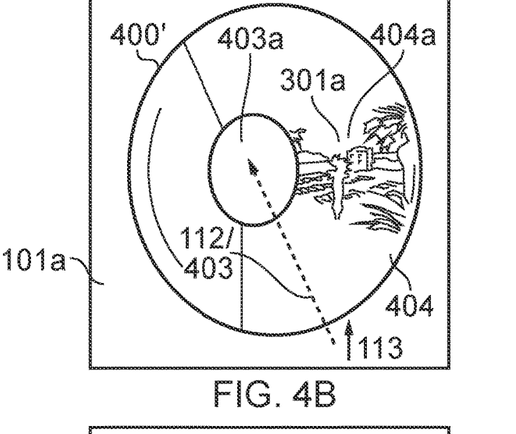

By looking at a certain direction, 113a which is towards the direction 112 of location B, a visualisation 400 may be generated and displayed (the visualisation 400 is shown in greater detail in FIGS. 4A and 4B).

This visualisation 400 takes the form of a virtual tube/tunnel which may appear and whose opening may become visible to the viewer as his/her gaze lingers in the direction 112. This virtual tube offers the viewer a visualisation 400 of visual content 201a from a second location B which is displayed at one end of the virtual tube, as well as a visualisation 400 of visual content 301a between the two locations (e.g. an image of the view between the two locations) which is displayed on an inner surface of the virtual tube. The viewer may peek at the visualisation 301a by tilting his/her head and thus changing his/her perspective viewpoint. The viewer may be allowed to alter the viewpoint that the virtual tube offers of the second location B via controls or gestures (e.g. alter the direction so the view of the second visual information 201, or the relative sizes of the visualisation 400). Alternatively, the viewpoint direction of the second visual information 201 may automatically move around such that the viewer may get an overview of the content of the second location B, whist still virtually remaining at location A. There may also be hints of at least a third location to which the viewer may access by navigating to/entering the virtual second location B.

Certain examples of the present disclosure may enable a viewer to switch/transition between providing a virtual reality display of the first visual information 101 to providing a virtual reality display of the second visual information 201. This may involve switching from accessing/receiving a first stream of visual presence capture information associated with a first presence capture location to accessing/receiving a stream of second visual presence capture information associated with a second presence capture location.

Such switching/transitioning between the virtual reality display of first and second visual information 101, 201 may be in response to receiving a user input for the same, not least for example a gesture, voice input, touch input or user actuation of a user input device, such as to select the displayed second visualisation information 201. In some examples, the viewer may "climb into" or enter the virtual tube/tunnel to navigate through it, i.e. the displayed visualisation information(s) are modified so as to create the appearance of the viewer moving from a first virtual location, through the tunnel, to a second virtual location. Such examples may thereby provide an intuitive and seamless switching between the first and second locations A and B.

In a first mode of operation, a viewer may be able to interact/visually navigate around/pan around the display of the first visual information 101 whereas, after such a switch/transition, a second mode of operation may come into being in which enables a viewer to interact/visually navigate around/pan around the second visual information 201, i.e. such that a viewer's head/gaze movement may be tracked and used to alter the perceived point of view at the second presence capture location.

Without limiting the scope of the claims, certain examples of the present disclosure may provide an improved method and apparatus for experiencing presence capture content and may enable seamless switching between presence capture locations (i.e. seamless switching between modes and the viewing of presence capture content, captured by differing presence capture devices at differing presence capture locations).

In various examples of the disclosure, the display of the first visual information 101 may correspond to the provision of a virtual reality display of the first visual information 101, i.e. a virtual reality immersive display of the environment of the first geographic location 103 in which a viewer is able to view around and pan across the display of the first visual information 101, for example such that the viewer's virtual point of view in the virtual reality display is dependent upon a determination of a viewer's real world point of view 113 when using a virtual reality display.

The viewpoint 102a' and its direction 102a of the first visual information 101 to be displayed may be selected and determined based on a viewer's real world point of view 113. Likewise, the viewpoint of the second visual information 201 may likewise be dependent on the determined real world point of view 113 of a viewer.

The position of the virtual object 401 and thus the position of virtual display surfaces 403a', 404a' and thus the position of the second and third visual information 201, 301 may be dependent upon one or more of the determined direction between the first and second geographic locations 103, 203 and a real world point of view 113 of a viewer.

FIG. 4A shows an example of a visualisation 400 as it would be perceived by a viewer in accordance with an example of the present disclosure. At least part 101a of first visual information 101 is displayed. Overlaying this, the visualisation 400 is generated and displayed in the form of a three-dimensional virtual tunnel 401 having an open-ended proximal end 405 and a distal end 406 (as per FIG. 2). A distal end 406 surface may define a virtual display surface 403a on which a display of at least a part 201a of the second visual information 201 may be displayed (not shown). At least a part of an inner surface 404 of the virtual tunnel 401 defines a second virtual display surface 404a onto which at least a part 301a of third visual information 301 is displayed in an overlaying manner. The overlay of the differing visual information may be opaque, semi-opaque, semi-transparent and/or the like. In the example shown in FIG. 4A, the viewer's real world point of view direction 113a is co-aligned with the direction 112 of the second geographical location 203 with respect to the first geographical location 103. With such a configuration, the cross-sectional shape of the virtual tunnel 401 is perceived to be circular. However, in the example of FIG. 4B, the real world point of view of the viewer 113 is not co-aligned with the direction 112 nor aligned with the primary axis 402 of the virtual tunnel 401. In this scenario, from such a viewpoint perspective, the cross-sectional shape of the virtual tunnel 401 would be perceived to be ellipsoidal. Accordingly, the shape 402a of the distal end 406 surface/first virtual display surface 403a and its inner wall surface/second virtual display surface 404a may be duly modified in view of the perspective of the viewer, i.e. in dependence on the viewer's real world point of view 113 (as may be determined by head or gaze tracking system) such that the virtual perspective of the virtual object 401 is dependent on the viewer's real world point of view 113. This may allow for the user to better view the third visual information, e.g. in a given direction.

The viewer's real world point of view 113 may be determined by, for example, accelerometers, electronic gyroscopes or electronic compasses. Alternatively, or in a addition, pupil tracking technology, based for example on computer vision, may be used to track movement of a user's eye or eyes and to direction of a user's gaze and hence viewer's real world point of view 113.

In some examples (not shown) the virtual object 401 may comprise at least one virtual exterior surface. Such a virtual exterior surface may itself provide a virtual display surface for visual information, or may, instead, simply be "transparent", i.e. so as to enable display of visual information there-through. However, in certain examples, the virtual exterior surface may be non-transparent/opaque/used as a virtual display surface on which further visual information is displayed. In such cases, the virtual exterior surface may occult one or more of the first virtual display surface 403a and the at least second virtual display surface 404a. In some examples, the virtual exterior surface may be considered to be in the foreground of the image, thereby occulting the background, virtual, inner surface.

FIGS. 4A and 4B schematically illustrate how a viewer may "peek" into a virtual tube by tilting his/her head/view to alter his/her perspective and the virtual perspective of the virtual tube, i.e. so as to reveal more of the inner surface/second virtual display surface 404a to be able to see more of the third visualisation information 301.

The display of the visualisations may be in response to one or more of:

Determining 802 that a direction of a viewer's real world point of view 113 is aligned with the direction 112 of the second geographic location 203 with reference to the first geographic location 103 (or at least that the direction is within a field of view of the viewer's real world point of view 113);

detecting a user input (not least for example gestures, voice input, touch input or user actuation) of a user input device;

geographical proximity of the first geographic location 103 with respect to the second geographic location 203;

temporal proximity of a time of capture of the first visual information 101 with respect to a time of capture of the second visual information 201; context information; and a user profile.

Figure 5A:
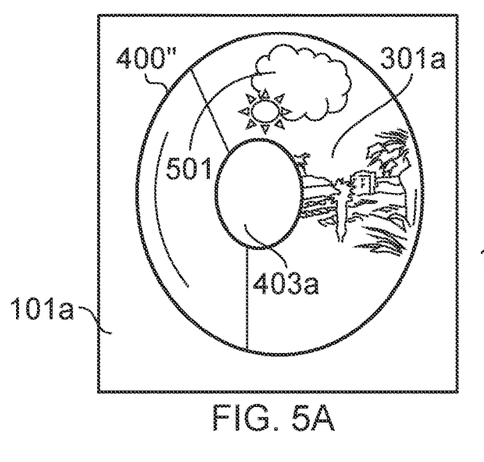
FIGS. 5A and 5B schematically illustrate further examples of a visualisation from a viewer's perspective.
Figure 5B:
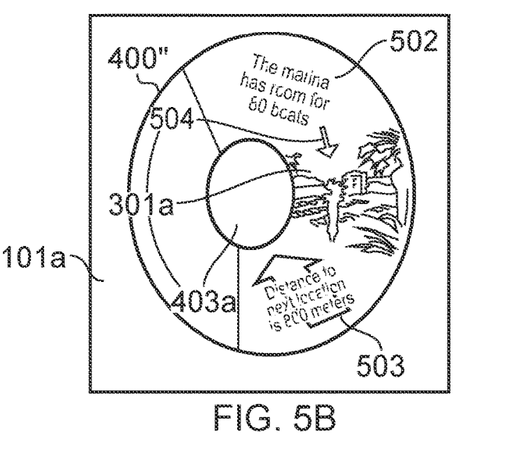

FIGS. 5A and 5B schematically illustrate additional visualisation information 501, 502, 503 that may be provided in addition to the third visualisation information 301a (which corresponds to a view between the first and second locations A and B). Such additional visualisations may comprise, not least for example graphics 501, text 502 and combination of graphics and text 503 that may provide additional visualisations and information to a viewer, not least for example current weather and advertising information as well as other textual information related to the area between the locations A and B.

In some examples, a viewer may select content that is visualised in the virtual tube for closer inspection. The viewer may also use visualised content as a shortcut to at least a third presence capture location if available. This may create a new virtual tube opening or it may create an intersection/connection within the first virtual tube (such a connection may be temporary).

The generation, availability and display of virtual tubes between presence capture locations may be based on parameters such as geographical proximity of the presence capture locations, closeness in time of capture of the presence capture information, other context dependent parameters or a combination of the same.

The transitioning between a first mode in which a viewer perceives a virtual reality environment of the first present capture location to the viewer perceiving a virtual reality environment of the second presence capture location may comprise the viewer navigating through the virtual object 401, which may occur, not least for example in response to a user input.

Alternatively, such navigation may be automated and form part of a "virtual tour". For example, in some embodiment, an automated navigation such as a "virtual tour" may indicate to the user the direction of the next presence capture location by means of automatically presenting the location of the corresponding virtual tube opening.

Figure 6:
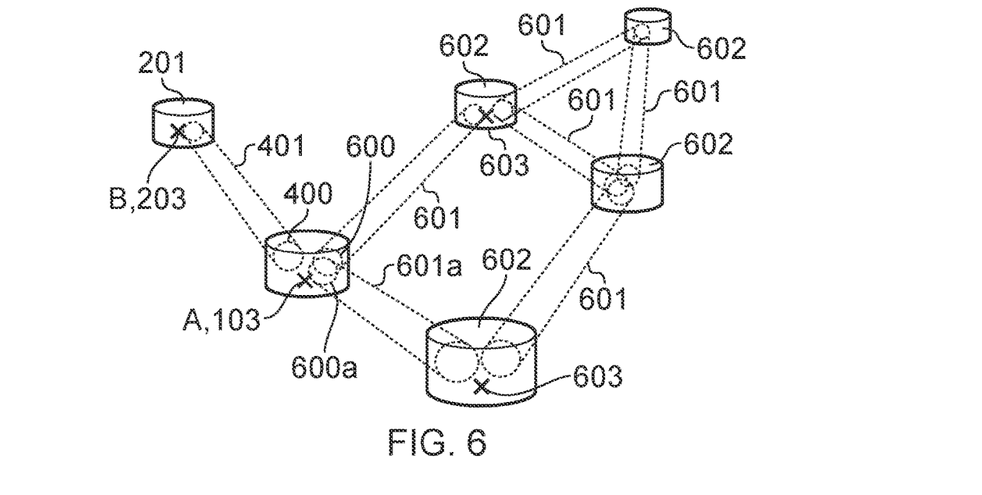
FIG. 6 schematically illustrates a network of presence capture locations and interconnecting visualisation links.

FIG. 6 schematically illustrates a network of a plurality of presence capture locations 103, 203 and 603 along with a plurality of virtual tunnels 401, 601 that enable a viewer, when viewing visual presence capture information 101, 201, 601 from one of the presence capture locations 103, 203, 603, to visually link/connect one of the presence capture locations 103 with another of the presence capture locations 203. As is shown in FIG. 6, a particular presence capture location 103, e.g. represented by first visual information 101, may have a plurality of virtual tunnels 401, 601, 601a and corresponding visualisations associated with the same 400, 600, 600a.

As shown in FIG. 6, in addition to a first visualisation 400, one or more further visualisations 600 may be displayed that visually interconnect the first visual information 101 that is displayed to a display of at least a part of fourth visual information 602.

FIG. 6 presents an illustration of possible virtual tube connections between presence capture locations based on what a viewer is currently looking at and a selected path 604 that is currently offered to the viewer.

In some examples, a viewer may follow a selected path/ network of presence capture locations and may find a virtual tube at a presence capture location corresponding to another path/network of presence capture locations. The viewer may be presented with instructions on how to return to said first path/network while enjoying the content of the second location. For example, a virtual tube may be one that features an intersection where the main direction is towards the next presence capture location and a secondary direction is towards a presence capture location related to the first path/network. Thus, a service may adapt the locations and tubes the viewer is offered such that at least two paths/ networks are at least partially combined into a single experience.

In some examples, a viewer may be offered a virtual tour of a city, i.e. via navigating through the network of FIG. 6, where each node represents presence capture locations of a city interlinked via a network of user navigable virtual tubes. Such a tour may be created for each user individually based on parameters that may include user preference settings. On the other hand, some presence capture locations may be restricted, e.g. for commercial reasons, and they may be available as fixed pay-per-view features or made available only for limited sets of users.

In some examples, a further visualisation 600a may be displayed which visually links a displayed at least part of the first visual information 101 to a display of at least part of a fourth visual information 602 (the fourth visual information 602 relating to a further presence capture location). In yet other examples (not shown), a further visualisation may visually link a displayed at least part 301a of the third visual information 301 to a display of at least a part of fifth visual information (the fifth visual information corresponding to a further presence capture location). In yet further examples, the further visualisation may visually link one visualisation to a yet further visualisation.

Figure 7:
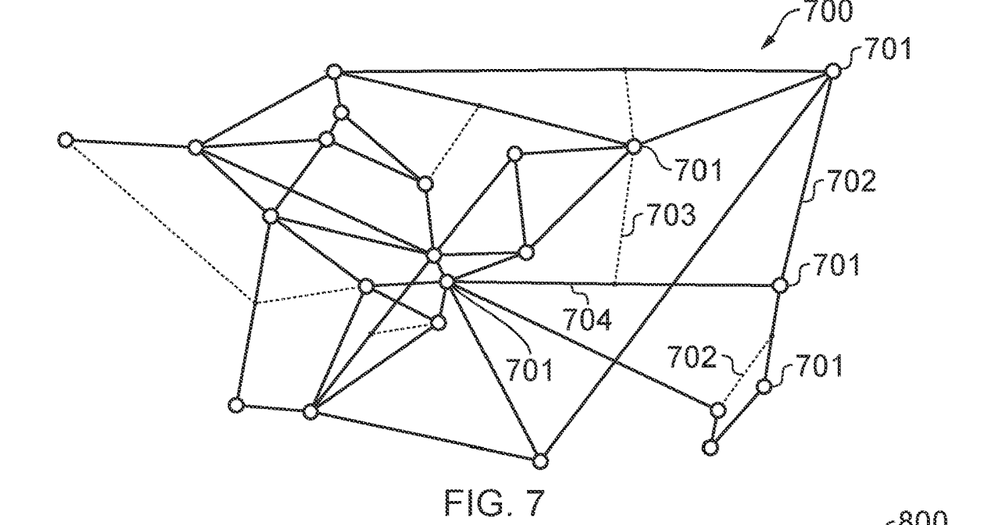
FIG. 7 schematically illustrates a network map of presence capture locations and interconnecting visualisation links.

FIG. 7 illustrates a larger network 700 of presence capture locations 701 with interconnecting virtual tubes/tunnels/ passageways 702. The system may adaptively control available paths/routes offered to a viewer. The nodes 701 represent available presence capture locations (i.e. locations for which presence capture information is available) that are interconnected with one another via links 702 (i.e. visualisation of user navigable virtual tunnels linking the nodes together).

In the network map 700 of FIG. 7, a plurality of presence capture locations 700 are shown as nodes in the map that are interconnected via virtual objects/virtual tunnels 702. Not only do the virtual objects/virtual tunnels 702 interconnect the nodes/presence capture locations 701, but also the virtual objects/virtual tunnels 702 may interconnect with one another. For example the virtual object/tunnel 703 may interconnect with a further virtual object/virtual tunnel 704. Such a network of virtual tunnels 702 linking presence capture locations 702 may provide a user navigable pathway through which a viewer may navigate from one virtual presence location to another through the virtual tunnel 701. Such viewer navigation may be upon user control/input or may be automated as part of a tour of the virtual network, i.e. so as to provide a predefined route through the virtual network that may enable a virtual sightseeing tour of a region.

FIG. 8 schematically illustrates a method 800 according to an example of the present disclosure.

In block 801, at least a part 101a of first visual information 101 that is a view 102a', from a first geographical location 103 is displayed.

In block 802, a visualisation 400 is generated that is configured to visually link the display of the at least a part 101a of the first visualisation information 101 with a display of at least a part 201a of second visual information 201 that is a view 202a' from a second geographical location 203. Such a generation of the visualisation may comprise, in sub-block 802a, determining (i.e. either via calculating or receiving) a direction 112 of the second geographical location 203 with respect to the first geographical location 103. Such a direction 112 may correspond to a virtual line of sight of the second geographical location 203 with respect to the first geographical location 103. In sub-block 802b, a virtual object 401 is defined having: a virtual primary axis 402 whose alignment/orientation is dependent on the determined direction 112; a virtual distal end surface 403, at least a part of which defines a virtual display surface 403a; and at least one virtual inner surface 404, at least part of which defines at least a second virtual display surface 404a.

In sub-block 802c, at least a part 201a of the second visual information 201 is displayed (e.g. simultaneously with and/ or overlaying the displayed first visual information 101) on the first virtual display surface 403a. The position of the first virtual display surface 403a and thus the position of the display of the second visual information 201 may depend on the determined direction 112 as well as a determined real world point of view of a viewer 113.

In sub-block 802d, at least a part 301a of third visual information 301 is displayed on the second virtual display surface 404a.

The block diagram of FIG. 8 represents one possible scenario among others. The order of the block shown is not absolutely required so in principle, the sequence of blocks can be performed out of order. In certain examples, one or more of the blocks may be performed in a different order or overlapping in time, in series or in parallel.

The blocks illustrated in FIG. 8 may represent actions in a method and/or sections of instructions/code in the computer program 904.

As will be appreciated, any such computer program instructions may be loaded onto a computer or other programmable apparatus (i.e., hardware) to produce a machine, such that the instructions when performed on the programmable apparatus create means for implementing the functions specified in the blocks. These computer program instructions may also be stored in a computer-readable medium that can direct a programmable apparatus to function in a particular manner, such that the instructions stored in the computer-readable memory produce an article of manufacture including instruction means which implement the function specified in the blocks. The computer program instructions may also be loaded onto a programmable apparatus to cause a series of operational actions to be performed on the programmable apparatus to produce a computer-implemented process such that the instructions which are performed on the programmable apparatus provide actions for implementing the functions specified in the blocks.

Examples of the present disclosure may take the form of a method, an apparatus or a computer program 904. Accordingly, examples may be implemented in hardware, software or a combination of hardware and software.

Figure 9:
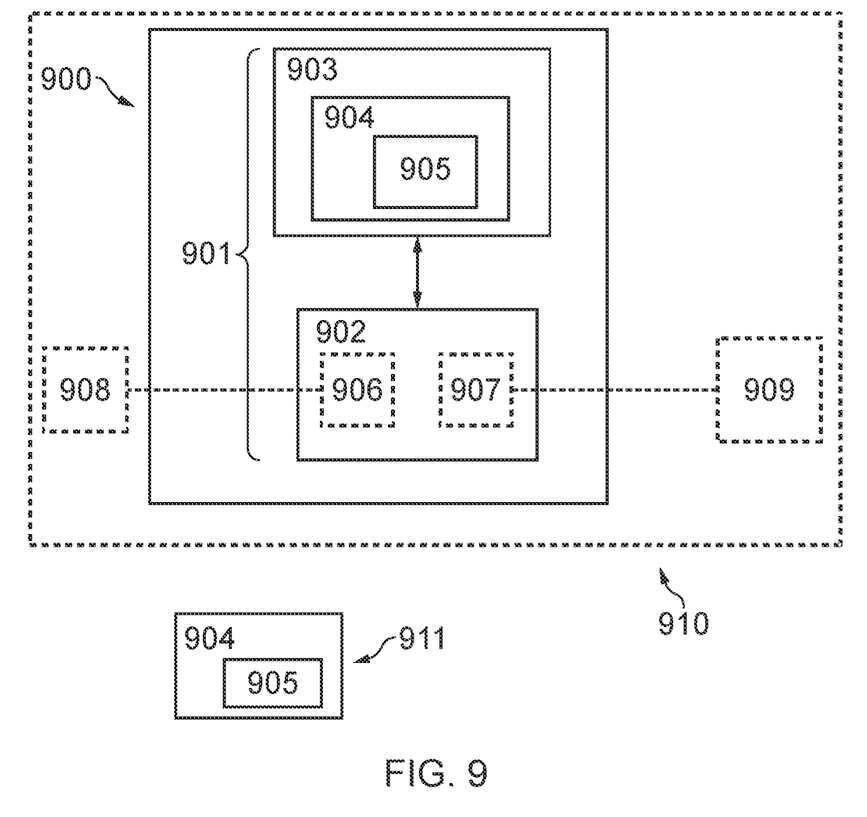
FIG. 9 schematically illustrates an apparatus.

FIG. 9 schematically illustrates a block diagram of an apparatus 900. The apparatus 900 comprising a controller 901. The controller 901 is configured to receive user input commands (i.e. from the user input device 908) and is configured to provide output commands (i.e. to control a display 909).

Implementation of the controller 901 can be in hardware alone (for example processing circuitry comprising one or more processors and memory circuitry comprising one or more memory elements), have certain aspects in software including firmware alone or can be a combination of hardware and software (including firmware).

The controller 901 may be implemented using instructions that enable hardware functionality, for example, by using executable computer program instructions in a general-purpose or special-purpose processor that may be stored on a computer readable storage medium (disk, memory etc.) or carried by a signal carrier to be performed by such a processor.

In the illustrated example, the apparatus 900 comprises a controller 901 which is provided by a processor 902 and memory 903. Although a single processor and a single memory are illustrated in other implementations there may be multiple processors and/or there may be multiple memories some or all of which may be integrated/removable and/or may provide permanent/semi-permanent/dynamic/cached storage.

The memory 903 stores a computer program 904 comprising computer program instructions 905 that control the operation of the apparatus 900 when loaded into the processor 902. The computer program instructions 905 provide the logic and routines that enable the apparatus 900 to perform the functionality and method described above.

The at least one memory 903 and the computer program instructions 905 are configured to, with the at least one processor 902, cause the apparatus 900 at least to perform the functionality and method described above and not least the method described, for example with respect to FIG. 8.

The processor 902 is configured to read from and write to the memory 903. The processor 902 may also comprise an input interface 906 via which data (such as visualisation information from storage 908, which may be local or remote of the device 910) and/or commands are input to the processor 902, and an output interface 907 via which data and/or commands (i.e. to control a display 909 to display the various parts of the visualisation information and visualisations) are output by the processor 902.

The computer program 904 may arrive at the apparatus 900 via any suitable delivery mechanism 911. The delivery mechanism 911 may be, for example, a non-transitory computer-readable storage medium, a computer program product, a memory device, a record medium such as a compact disc read-only memory, or digital versatile disc, or an article of manufacture that tangibly embodies the computer program 904. The delivery mechanism 911 may be a signal configured to reliably transfer the computer program 904.

The apparatus 900 may receive, propagate or transmit the computer program 904 as a computer data signal.

The apparatus 900 may be comprised in a device 910, for example: a client device, a server device, a mobile cellular telephone, a wireless communications device, a hand-portable electronic device, a display device or a virtual reality display system etc. or a module or chipset for use in any of the foregoing.

Examples of the present disclosure and the functionality provided by such examples have been described above and also with reference to the Figures and schematic block diagrams described. It will be understood that such functionality and each block (of the flowchart illustrations and block diagrams), and combinations of blocks, can be implemented by computer program instructions 905 of a computer program 904. These program instructions 905 may be provided to one or more processor(s) 902, processing circuitry or controller(s) such that the instructions, when executed, create means for causing implementing the functions specified in the block or blocks. The computer program instructions 905 may be executed by the processor(s) 902 to cause a series of operational steps/actions to be performed by the processor(s) 902 to produce a computer implemented process such that the instructions which execute on the processor(s) 902 provide steps for implementing the functions specified in the block or blocks.

Accordingly, the present disclosure supports: combinations of means for performing the specified functions; combinations of actions for performing the specified functions; and computer program instructions/algorithm 905 for performing the specified functions. It will also be understood that each function, and combinations of functions, can be implemented by special purpose hardware-based systems which perform the specified functions or actions, or combinations of special purpose hardware and computer program instructions 905.

Although examples of the apparatus 900 have been described above in terms of comprising various components, it should be understood that the components may be embodied as or otherwise controlled by a corresponding controller or circuitry such as one or more processing elements or processors of the apparatus. In this regard, each of the components described above may be one or more of any device, means or circuitry embodied in hardware, software or a combination of hardware and software that is configured to perform the corresponding functions of the respective components as described above.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analogue and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In one example, the apparatus 900 is embodied on a hand held portable electronic device, such as a mobile telephone, wearable computing device or personal digital assistant, that may additionally provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

The apparatus 900 may be provided in a module. As used here 'module' refers to a unit or apparatus that excludes certain parts/components that would be added by an end manufacturer or a user.

Figure 10:
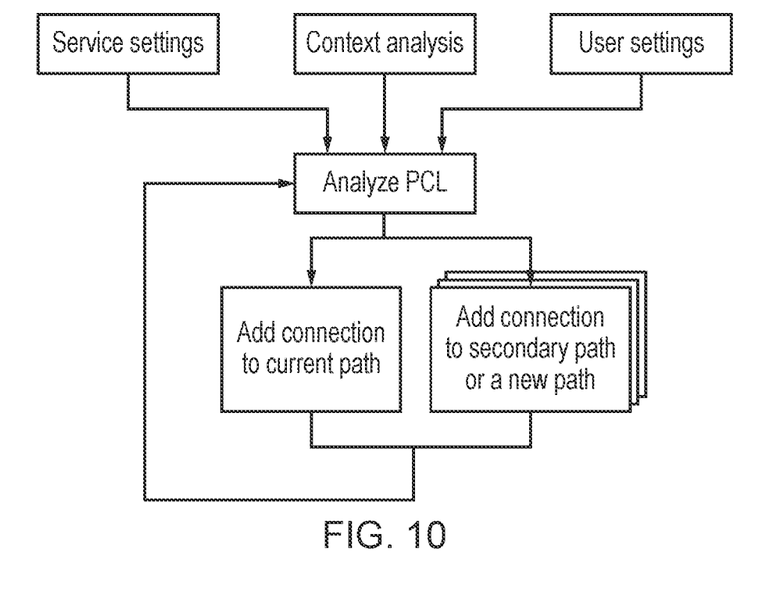
FIG. 10 schematically illustrates a further method.

FIG. 10 schematically illustrates a connection creation system for building connections between presence capture locations, e.g. creating virtual tunnels/visualisations between nodes/presence capture locations. In this method, presence capture information of a presence capture location may be analysed. User settings, context analysis and service settings may also be involved in analysis of the presence capture information. As a result of the analysis, a connection to a current path may be created. Alternatively, a connection to a secondary path may be made or a new path may be created.

Examples of the present disclosure provide a method, computer program, user interface and apparatus comprising various modules, means or circuitry that provide the functionality described above and for performing the actions of the method. The modules, means or circuitry may be implemented as hardware, or may be implemented as software or firmware to be performed by a computer processor 902. In the case of firmware or software, examples of the present disclosure can be provided as a computer program 904 product including a computer readable storage structure embodying computer program instructions 905 (i.e. the software or firmware) thereon for performing by the computer processor 902.

The apparatus 900 may be provided in an electronic device, for example, mobile terminal, according to an exemplary embodiment of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples the apparatus 900 may be provided in a mobile terminal, other types of electronic devices, such as, but not limited to: virtual reality display devices, hand portable electronic devices, wearable computing devices, portable digital assistants (PDAs), mobile computers, desktop computers, televisions, gaming devices, laptop computers, cameras, video recorders, GPS devices and other types of electronic systems, may readily employ examples of the present disclosure. Furthermore, devices may readily employ examples of the present disclosure regardless of their intent to provide mobility.

The examples of the present disclosure and the accompanying claims may be suitably combined in any manner apparent to one of ordinary skill in the art. Features described in the preceding description may be used in combinations other than the combinations explicitly described. Although functions have been described with reference to certain features, those functions may be performable by other features whether described or not. Although features have been described with reference to certain examples, those features may also be present in other examples whether described or not. Although various examples of the present disclosure have been described in the preceding paragraphs, it should be appreciated that modifications to the examples given can be made without departing from the scope of the invention as set out in the claims.

Without limiting the scope of the claims, certain particular examples of the present disclosure may prove an improved display both first presence capture information (of a first presence capture location) as well as at least a portion of second presence capture information (of a second presence capture location) simultaneously. This may be the case where a viewer, being virtually present at a first presence capture location, may wish additionally to see a view from another presence capture location, e.g. to decide whether or not to transition/switch to being virtually at the second presence capture location. For example, first presence capture information could be primarily displayed (i.e. such that a viewer may perceive/experience the environment of the first presence capture location and can be considered to be "virtually" at the first presence capture location) but also a part of second presence capture information may also be displayed. This may be done so as to enable a viewer to be virtually at the first presence location but also to see a view from a second presence capture location (whilst remaining virtually in the first virtual presence capture location). This may enable the viewer to decide whether or not to switch or navigate from the first presence capture location to the second presence capture location so as to primarily view the second presence capture information and perceive/experience the environment of the second presence capture location (such that the viewer might be considered to be "virtually" at the second presence capture location).

Without limiting the scope of the claims, certain examples of the present disclosure seek to provide an improved method and apparatus for displaying presence capture information. The user experience of viewing/perceiving presence capture information of a presence capture location via a presence capture information rendering device may be fully immersive and may feel very real to the viewer. Certain examples of the present disclosure seek to enable the display of first and second presence capture information in an intuitive way that is less disorientating, intrusive and perturbing to a viewer thereby reducing any adverse effect on a viewer's level of immersion and user experience when consuming presence capture content. Certain examples of the present disclosure seek to generate and display a visualisation 400 that visually links a display of first presence capture information to a display of second presence capture information so as to provide a more intuitive link between the two displays of presence capture information and to facilitate switching between presence capture locations. Certain examples may seek to provide a simultaneous display of first and second presence capture information in an intuitive manner that is less disorientating or distracting to a viewer who may be deeply immersed in viewing the presence capture information, e.g. in a virtual reality environment. This may enhance a viewer's level of immersion and improve the viewer's user experience of consuming presence capture content. Certain examples may enable a viewer to better perceive a relative location/displacement of the first and second presence capture locations, thereby providing a more intuitive and immersive display of presence capture information.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, references to "a/an/the" [feature, element, component, means . . . ] are to be interpreted as "at least one" [feature, element, component, means . . . ] unless explicitly stated otherwise. In this description, the wording 'connect', 'couple' and 'communication' and their derivatives mean operationally connected/coupled/in communication. It should be appreciated that any number or combination of intervening components can exist (including no intervening components).

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

In the above description, the apparatus described may alternatively or in addition comprise an apparatus which in some other embodiments comprises a distributed system of apparatus, for example, a client/server apparatus system. In examples of embodiments where an apparatus provided forms (or a method is implemented as) a distributed system, each apparatus forming a component and/or part of the system provides (or implements) one or more features which collectively implement an example of the present disclosure. In some examples of embodiments, an apparatus is reconfigured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

Various examples of the present disclosure may provide a user interface and system for seamless switching between presence capture locations using a visualisation, referred to as "virtual tubes". The virtual tube may correspond to a tube, cone or tunnel that is created between at least two virtual locations to visualise a smooth transition between the representations of the locations.

A viewer who views a first location may assess the relation the second location to the first location by viewing the tube opening. The view through the tube opening may offer a view to at least the second location whilst the inside walls of the tube may give a visualisation of what appears between the two locations. With such a visualisation, the viewer may ascertain as to whether or not the second location is of interest to the viewer and if the viewer would desire to view the second location in further detail. The position of the opening may correspond to the physical position of at least a second location in relation to the first location. The virtual tube opening may become visible, e.g. through a gesture, by looking in the direction of the virtual opening, etc. in a way such that it is not intrusive or distracting to the viewer when immersed in the representation of the first location. The viewer may also enter into the tube in order to access the second location and view its content. During such a transition traversing through the tube, content between the two locations may be presented to the viewer, for example, a representation of a view between the two locations.

The invention claimed is:
1. An apparatus comprising:
at least one processor; and
at least one memory including computer program code,
the at least one memory and the computer program code configured to, with the at least one processor, cause the apparatus to perform at least:

displaying at least a part of first visual information that is a first view from a first direction from a first geographical location;

generating a visualisation configured to visually link the display of the at least a part of the first visual information with a display of at least a part of second visual information that is a second view, from a second direction different from the first direction, from a second geographical location different from the first geographical location, wherein generating the visualisation comprises:

modifying the second visual information based on the first visual information so as to correspond to the first view;

defining a virtual object having: a virtual primary axis aligned in dependence on at least the modified second visual information, a virtual distal end surface, at least a part of which defines a first virtual display surface, at least one virtual inner surface, and at least a part of which defines at least a second virtual display surface;

displaying on the first virtual display surface at least a part of the second visual information;

displaying on the at least second virtual display surface at least a part of third visual information; and enabling a viewer to visually navigate through the virtual object.

2. The apparatus of claim 1, wherein a shape of the virtual object comprises at least one of more of: a tube, a tunnel, a cylinder, a cone, a frusto-conical shape, a polyhedron, a hexahedron, a prism, a pyramid, a frustum, an open ended three dimensional shape and an elongate shape.

3. The apparatus of claim 1, wherein at least one of a size of the first virtual display surface or a virtual depth of the virtual object is dependent on a separation distance between the first geographical location and the second geographical location.

4. The apparatus of claim 1, wherein a virtual depth of the virtual object is dependent on a separation distance between the first geographical location and the second geographical location.

5. The apparatus of claim 1, wherein the at least a part of the third visual information comprises a view from a third geographical location.

6. The apparatus of claim 5, wherein one or more of the first visual information, the second visual information and the third visual information corresponds to a first image, a second image, and a third image captured at the first geographical location, the second geographical location, and the third geographical location respectively.

7. The apparatus of claim 1, wherein the at least one memory including the computer program code is configured to with the at least one processor to further cause the apparatus to:

enable a viewer to visually navigate around the first visual information.

8. The apparatus of claim 1, wherein the at least one memory including the computer program code is configured to with the at least one processor to further cause the apparatus to:

switch between a first mode in which a viewer is able to visually navigate around the first visual information to a second mode in which a viewer is able to visually navigate around the second visual information.

9. The apparatus of claim 1, wherein the at least one memory including the computer program code is configured to with the at least one processor to further cause the apparatus to:

display a further visualisation, wherein the further visualisation visually links: the displayed at least a part of the first visual information to a display of at least a part of fourth visual information, the displayed at least a part of the third visual information to a display of at least a part of fifth visual information, or the displayed visualisation to a display of another further visualisation.

10. The apparatus of claim 1, wherein the at least one memory including the computer program code is configured to with the at least one processor to further cause the apparatus to:

provide a network of nodes and interconnecting links, wherein each node represents a geographical location for which visualisation information is available and each interconnecting link is a user navigable visualisation linking two respective geographical locations.

11. The apparatus of claim 1, wherein generating the visualisation is in response to one or more of: determining that a direction of a viewer's real world point of view is substantially aligned with the direction, detecting a user input, and determining a geographical proximity of the first geographic location with respect to the second geographic location.

12. The apparatus of claim 1, wherein generating the visualisation is in response to one or more of: determining a temporal proximity of a time of capture of the first visual information with respect to a time of capture of the second visual information, context information, and a user profile.

13. A method comprising:

displaying at least a part of first visual information that is a first view from a first direction from a first geographical location;

generating a visualisation configured to visually link the display of the at least a part of the first visual information with a display of at least a part of second visual information that is a second view, from a second direction different from the first direction, from a second geographical location different from the first geographical location, wherein generating the visualisation comprises:

modifying the second visual information based on the first visual information so as to correspond to the first view;

defining a virtual object having: a virtual primary axis aligned in dependence on at least the modified second visual information, a virtual distal end surface, at least a part of which defines a first virtual display surface, at least one virtual inner surface, and at least a part of which defines at least a second virtual display surface;

displaying on the first virtual display surface at least a part of the second visual information;

displaying on the at least second virtual display surface at least a part of third visual information; and enabling a viewer to visually navigate through the virtual object.

14. The method of claim 13, wherein a shape of the virtual object comprises at least one of more of: a tube, a tunnel, a cylinder, a cone, a frusto-conical shape, a polyhedron, a hexahedron, a prism, a pyramid, a frustum, an open ended three dimensional shape and an elongate shape.

15. The method of claim 13, wherein at least one of a size of the first virtual display surface or a virtual depth of the virtual object is dependent on a separation distance between the first geographical location and the second geographical location.

16. The method of claim 13, wherein the at least a part of the third visual information comprises a view from a third geographical location.

17. The method of claim 13, further comprising
displaying a further visualisation, wherein the further visualisation visually links: the displayed at least a part of the first visual information to a display of at least a part of fourth visual information, the displayed at least a part of the third visual information to a display of at least a part of fifth visual information, or the displayed visualisation to a display of another further visualisation.

18. The method of claim 13, wherein generating the visualisation is in response to one or more of: determining that a direction of a viewer's real world point of view is substantially aligned with the direction, detecting a user input, and determining a geographical proximity of the first geographic location with respect to the second geographic location.

19. The method of claim 13, wherein generating the visualisation is in response to one or more of: determining a temporal proximity of a time of capture of the first visual information with respect to a time of capture of the second visual information, context information, and a user profile.

20. At least one non-transitory computer readable medium comprising instructions that, executed by at least one processor, to perform at least:

displaying at least a part of first visual information that is a first view from a first direction from a first geographical location;

generating a visualisation configured to visually link the display of the at least a part of the first visual information with a display of at least a part of second visual information that is a second view, from a second direction different from the first direction, from a second geographical location different from the first geographical location, wherein generating the visualisation comprises:

modifying the second visual information based on the first visual information so as to correspond to the first view;

defining a virtual object having: a virtual primary axis aligned in dependence on at least the direction modified second visual information, a virtual distal end surface, at least a part of which defines a first virtual display surface, at least one virtual inner surface, and at least a part of which defines at least a second virtual display surface;

displaying on the first virtual display surface at least a part of the second visual information; displaying on the at least second virtual display surface at least a part of third visual information; and enabling a viewer to visually navigate through the virtual object.

* * * * *